United States Patent
Ou

(10) Patent No.: US 7,915,556 B2
(45) Date of Patent: Mar. 29, 2011

(54) INPUT PANEL AND PORTABLE ELECTRONIC DEVICE USING THE SAME

(75) Inventor: Tsung-Yuan Ou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 356 days.

(21) Appl. No.: 12/129,658

(22) Filed: May 29, 2008

(65) Prior Publication Data

US 2009/0107824 A1  Apr. 30, 2009

(30) Foreign Application Priority Data

Oct. 25, 2007  (TW) ................................ 96140048 A

(51) Int. Cl.
*H03K 17/975* (2006.01)
(52) U.S. Cl. .......................... 200/600; 200/516; 200/517
(58) Field of Classification Search .................. 200/600, 200/513, 517; 345/168, 173, 174; 341/33; 400/479.1
See application file for complete search history.

(56) References Cited

U.S. PATENT DOCUMENTS

| 6,680,731 | B2* | 1/2004 | Gerpheide et al. | 345/173 |
| 6,924,789 | B2* | 8/2005 | Bick | 345/168 |
| 7,348,967 | B2* | 3/2008 | Zadesky et al. | 345/173 |
| 2002/0049070 | A1 | 4/2002 | Bick | |
| 2008/0094373 | A1* | 4/2008 | Song | 345/173 |
| 2009/0223801 | A1* | 9/2009 | Murakami et al. | 200/513 |

FOREIGN PATENT DOCUMENTS

| CN | 1606321 | 4/2005 |
| EP | 1081922 | 3/2001 |
| EP | 1262861 | 12/2002 |
| WO | 2005/019987 | 3/2005 |

* cited by examiner

*Primary Examiner* — Felix O Figueroa
(74) *Attorney, Agent, or Firm* — Jianq Chyun IP Office

(57) ABSTRACT

An input panel for a portable electronic device including a switch sheet, a touch-sensing sheet and an interposing sheet is provided. The switch sheet includes a circuit board and at least one dome switch. The circuit board has at least one contact pad, and the dome switch is disposed on the contact pad. The touch-sensing sheet is disposed on the switch sheet for sensing a touch action. The interposing sheet is disposed between the switch sheet and the touch-sensing sheet. The touch-sensing sheet contacts the dome switch when the touch-sensing sheet is pressed, so that the dome switch is deformed elastically to switch on the contact pad.

14 Claims, 4 Drawing Sheets

INPUT PANEL AND PORTABLE ELECTRONIC DEVICE USING THE SAME

CROSS-REFERENCE TO RELATED APPLICATION

This application claims the priority benefit of Taiwan application serial no. 96140048, filed on Oct. 25, 2007. The entirety of the above-mentioned patent application is hereby incorporated by reference herein and made a part of this specification.

BACKGROUND OF THE INVENTION

1. Field of the Invention

The present invention relates to an input panel, and more particularly to an input panel used in a portable electronic device.

2. Description of Related Art

As the development of science and technology, people have a continuously increasing dependency on electronic products. In order to meet the requirements on the current electronic products in terms of high speed, high performance, and light, thin, short, small, various portable electronic devices such as ultra mobile personal computer (UMPC), tablet PC, pocket PC, personal digital assistant (PDA), cell phone, and notebook PC are more and more frequently used.

In the conventional art, the keyboard and the touch panel are generally used in the current portable electronic device as a data input interface. However, due to the structure differences, the user may have incorrect contacts by mistake when operating the portable electronic device and as a result, an unexpected function is executed.

SUMMARY OF THE INVENTION

The present invention is directed to an input panel, which can not only sense a touch action provided when the user inputs an instruction, but also provide the user with a touch feeling similar to the feeling of pressing the button, such that the user can confirm whether the action of inputting the instruction is finished or not.

The present invention is directed to a portable electronic device, which can not only sense a touch action provided when the user inputs an instruction, but also provide the user with a touch feeling similar to the feeling of pressing the button, such that the user can confirm whether the action of inputting the instruction is finished or not.

The present invention provides an input panel applicable for a portable electronic device. The input panel includes a switch sheet, a touch-sensing sheet, and an interposing sheet. The switch sheet includes a circuit board and at least one dome switch. The circuit board has at least one contact pad. The dome switch is disposed on the contact pad. The touch-sensing sheet is disposed on the switch sheet for sensing a touch action. The interposing sheet is disposed between the switch sheet and the touch-sensing sheet. The touch-sensing sheet contacts the dome switch when the touch-sensing sheet is pressed, so that the dome switch is deformed elastically to switch on the contact pad.

The present invention further provides a portable electronic device, which includes a casing, a display unit, and the input panel. The display unit and the input panel are assembled to the casing and electrically connected to each other. The display unit has a display area, and the display area is exposed out of the casing.

The input panel of the present invention has the touch-sensing sheet and the switch sheet, which can not only sense the touch action provided when the user inputs an instruction, but also provide the user with a touch feeling similar to the feeling of pressing the button. Furthermore, through adopting the input panel, the portable electronic device of the present invention is capable of offering a desirable manipulating feeling.

In order to make the aforementioned and other objectives, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
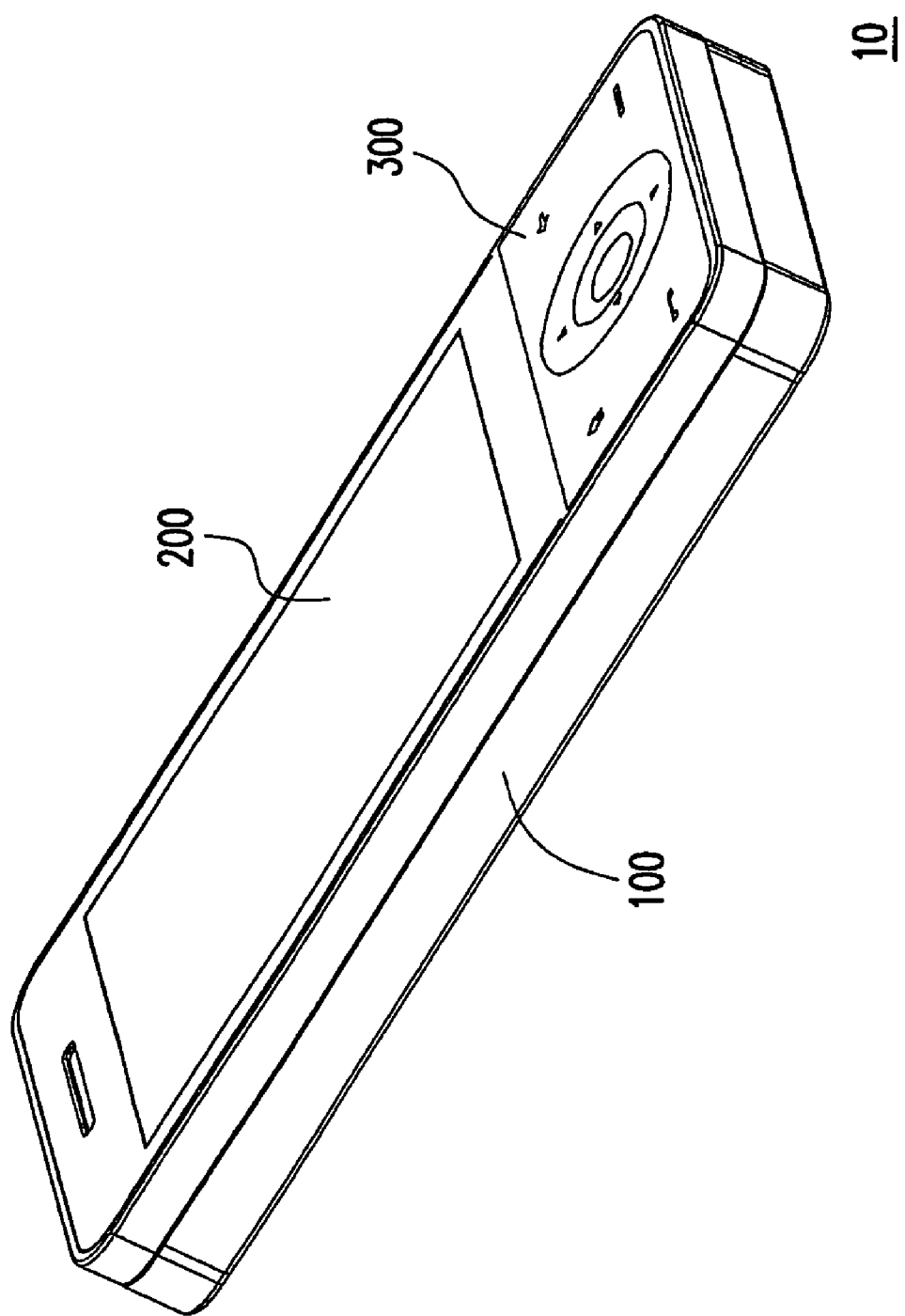
FIG. 1 is a schematic structural view of a portable electronic device according to an embodiment of the present invention.
Figure 2:
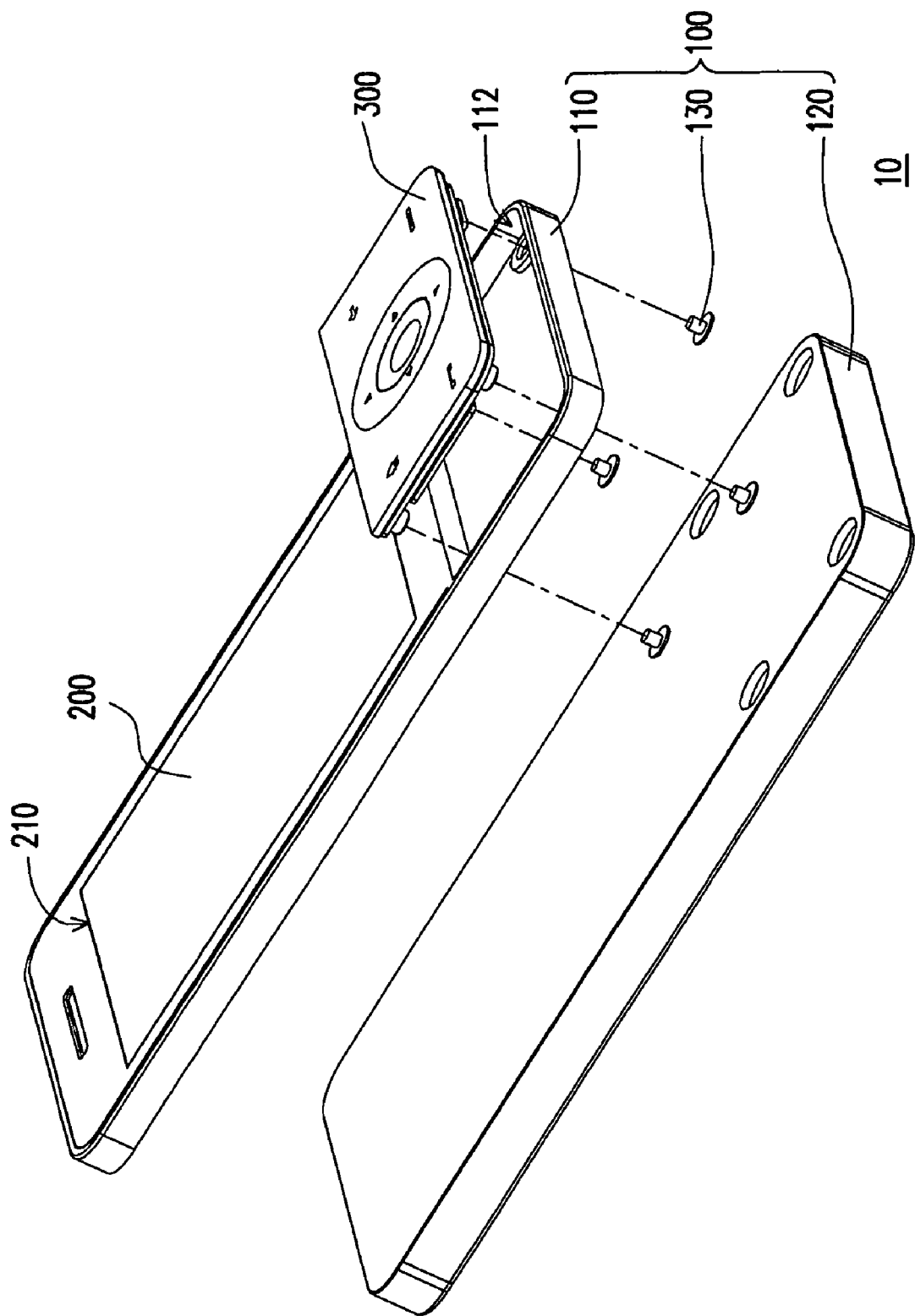
FIG. 2 is an exploded view of FIG. 1.

FIG. 1 is a schematic structural view of a portable electronic device according to an embodiment of the present invention, and FIG. 2 is an exploded view of FIG. 1. Referring to FIGS. 1 and 2, the portable electronic device 10 is, for example, a mobile phone, a smart phone, or a personal digital assistant (PDA). The portable electronic device 10 includes a casing 100, a display unit 200, and an input panel 300. In this embodiment, the casing 100 includes, for example, an upper casing 110, a lower casing 120, and a plurality of screws 130, but the present invention is not limited thereby. The upper casing 110 is assembled to the lower casing 120, and thus has an accommodating portion 112. The display unit 200 is assembled to the upper casing 110, and a display area 210 of the display unit 200 is exposed out of the upper casing 110. The input panel 300 is electrically connected to the display unit 200, and assembled to the accommodating portion 112 via the screws 130.

Figure 3A:
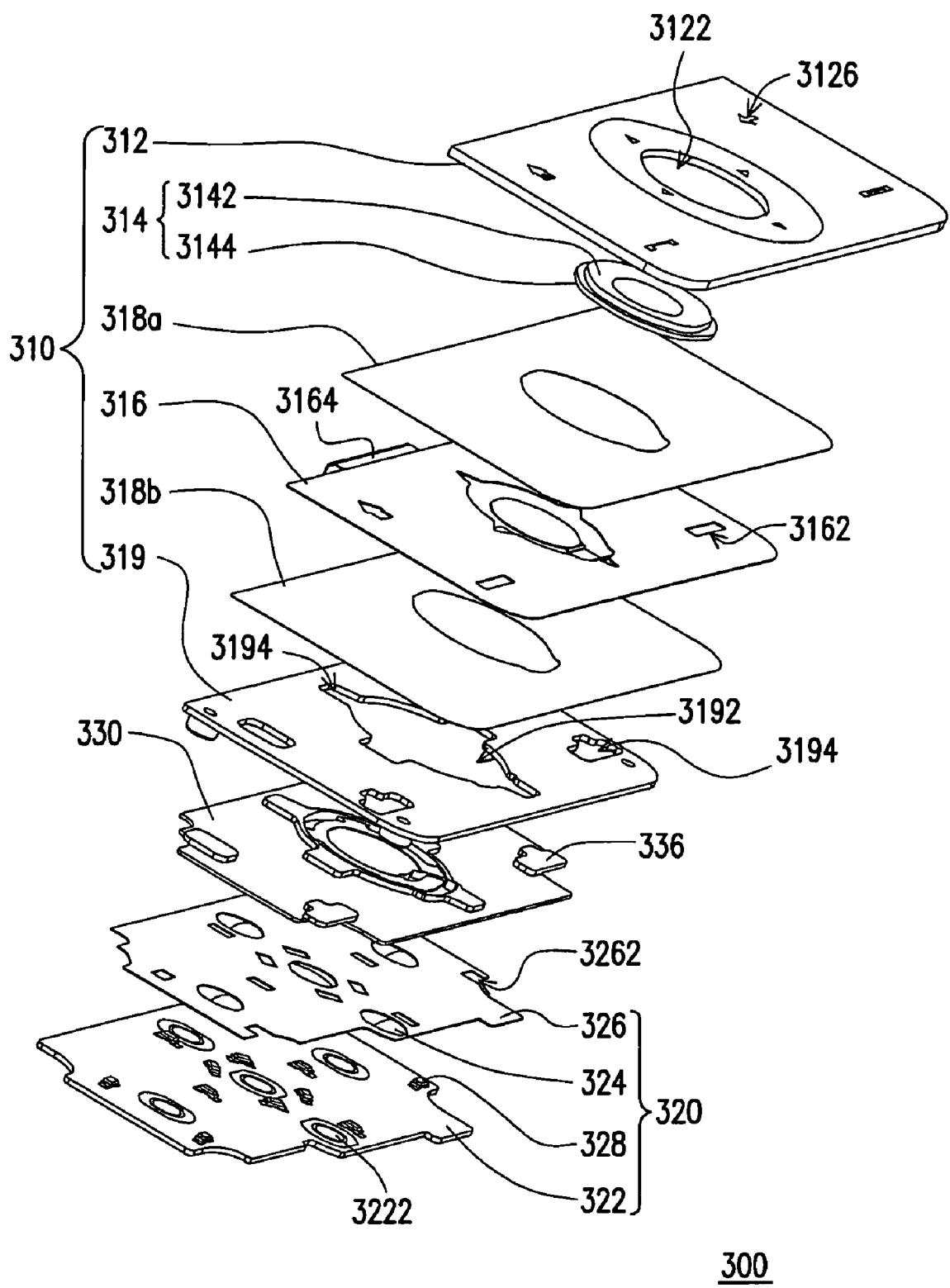
FIG. 3A is an exploded view of the input panel in FIG. 2.
Figure 3B:
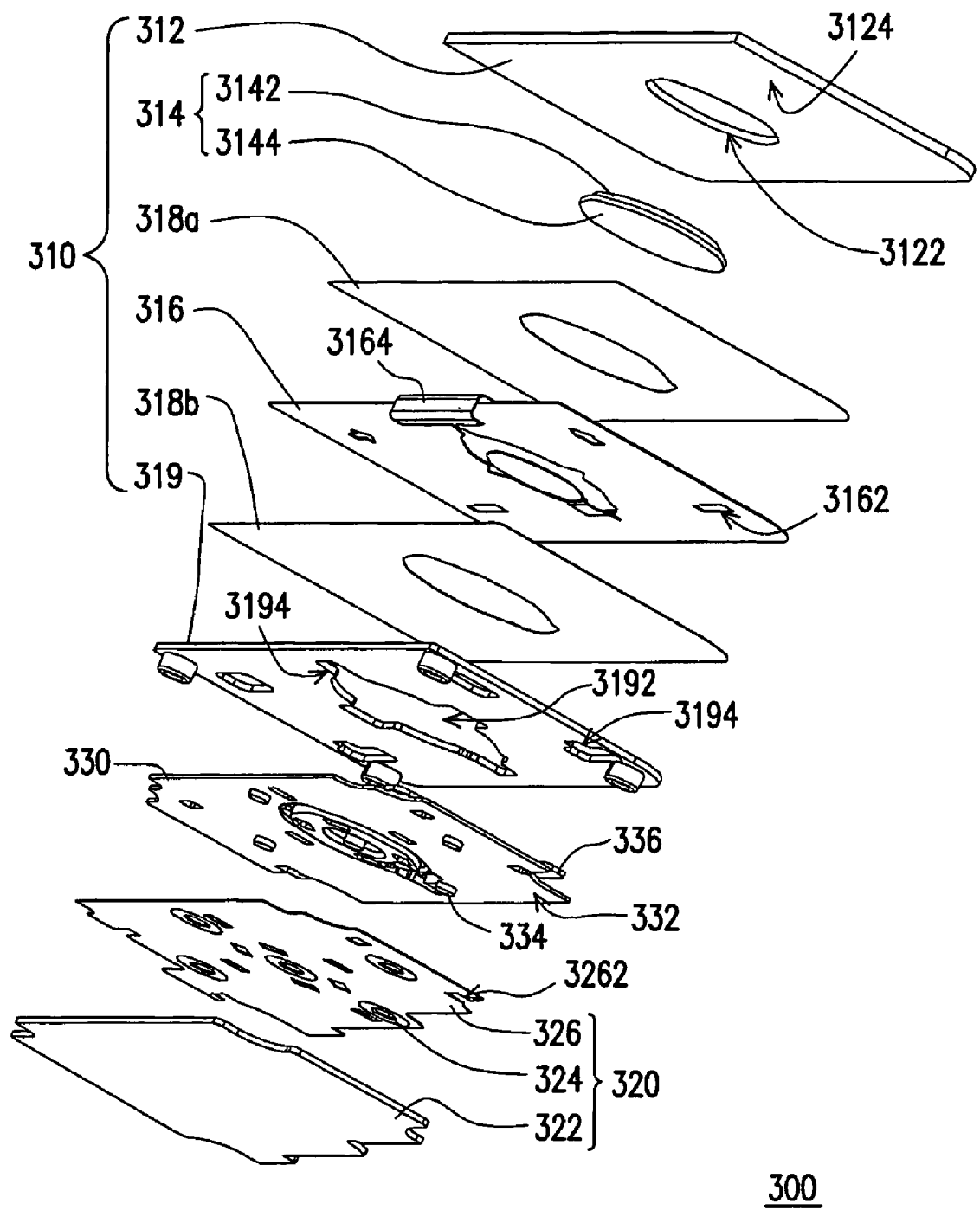
FIG. 3B is an exploded view of FIG. 3A from another viewing angle.

FIG. 3A is an exploded view of the input panel in FIG. 2, and FIG. 3B is an exploded view of FIG. 3A from another viewing angle. Referring to FIGS. 3A and 3B, the input panel 300 includes a touch-sensing sheet 310, a switch sheet 320, and an interposing sheet 330. The switch sheet 320 is disposed between the upper casing 110 and the touch-sensing sheet 310 in FIG. 2, and the interposing sheet 330 is disposed between the touch-sensing sheet 310 and the switch sheet 320.

In this embodiment, the touch-sensing sheet 310 further includes a keypad lens 312, an enter key cap 314, a sensing circuit board 316, a first adhesion layer 318a, a second adhesion layer 318b, and a supporting sheet 319. The keypad lens 312 has a first opening 3122, and the enter key cap 314 passes through the first opening 3122 and has a pressing portion 3142 and a limiting portion 3144. The pressing portion 3142 has a shape substantially consistent with that of the first opening 3122, so as to be disposed within the first opening 3122. That is, after the keypad lens 312 and the enter key cap 314 are assembled together, the pressing portion 3142 of the enter key cap 314 actually fills up the whole first opening 3122. Furthermore, the limiting portion 3144 protrudes outwards from the periphery of the pressing portion 3142, such that the limiting portion 3144 leans against a bottom surface 3124 of the keypad lens 312 after the pressing portion 3142 is disposed in the first opening 3122. Moreover, in other embodiments which are not shown, the keypad lens 312 and the enter key cap 314 may be formed integrally.

The sensing circuit board 316 is, for example, a capacitor sensing circuit board disposed between the keypad lens 312 and the supporting sheet 319 for sensing a touch action. The touch action may be a writing action or a clicking action executed on the keypad lens 312 by the user. Moreover, the supporting sheet 319 is for example a rigid supporting sheet made of for example a metal. Otherwise, the supporting sheet 319 may be made of plastic. The first adhesion layer 318a is disposed between the keypad lens 312 and the sensing circuit board 316, and the second adhesion layer 318b is disposed between the sensing circuit board 316 and the supporting sheet 319, for achieving the function of adhering and fixing. Moreover, in other embodiments, the sensing circuit board 316 may be a thermal sensing circuit board or other sensing circuit boards.

Moreover, the switch sheet 320 includes a circuit board 322 and at least one dome switch 324 (more than one dome switch is shown in this embodiment). The circuit board 322 is for example a printed circuit board electrically connected to the sensing circuit board 316 and having at least one contact pad 3222 (more than one contact pad is shown in this embodiment). The circuit board 322 is electrically connected to the sensing circuit board 316 through a flexible flat cable 3164 extended from the sensing circuit board 316. The dome switches 324 are disposed on the contact pads 3222. The touch-sensing sheet 310 contacts the dome switches 324 via the interposing sheet 330 when the touch-sensing sheet 310 is pressed, so that the dome switch 324 approximately below the pressed portion is deformed elastically to switch on the corresponding contact pad 3222. Meanwhile, the user may have a contact feeling similar to the feeling of pressing the keyboard, and thereby confirming whether the action of inputting instruction is finished or not.

In this embodiment, the switch sheet 320 further includes a plastic sheet 326 made of polyethylene terephthalate (PET) or other insulating materials. Moreover, the dome switches 324 and the plastic sheet 326 may be formed integrally, such that the dome switches 324 are electrically insulated from each other, and when the plastic sheet 326 is assembled to the circuit board 322, the alignment between the dome switches 324 and the contact pads 3222 may be accomplished once. The mode for the touch-sensing sheet 310 to contact the switch sheet 320 via the interposing sheet 330 in this embodiment is illustrated below in detail.

In this embodiment, the supporting sheet 319 may have a second opening 3192 corresponding to the first opening 3122. Moreover, the screws 130 pass through the upper casing 110 in FIG. 2 for being fastened with the supporting sheet 319, so as to assemble the input panel 300 into the accommodating portion 112 in FIG. 2.

Moreover, the interposing sheet 330 is made of for example rubber material and is disposed between the switch sheet 320 and the supporting sheet 319. A bottom surface 332 of the interposing sheet 330 has at least one protrusion 334 (more than one protrusion is shown in this embodiment). When the input panel 300 is assembled to the accommodating portion 112 in FIG. 2, the limiting portion 3144 leaning against the bottom surface 3124 of the keypad lens 312 is disposed in the second opening 3192, and the interposing sheet 330 covers at least a part of the second opening 3192, so as to support the enter key cap 314. Moreover, the protrusions 334 are corresponding to the dome switches 324. Therefore, when the touch-sensing sheet 310 is pressed, the protrusion 334 approximately below the pressed portion contacts the corresponding dome switch 324, so that the dome switch 324 is deformed elastically to switch on the contact pad 3222.

Besides, the touch-sensing sheet 310 may further have a plurality of transparent pattern areas 3126, and the sensing circuit board 316 may have a plurality of through holes 3162. Furthermore, the switch sheet 320 may further include a plurality of LEDs 328 disposed on the circuit board 322, and the plastic sheet 326 may have a plurality of assembling holes 3262, and the LEDs 328 pass through and disposed within the assembling holes 3262. Moreover, the supporting sheet 319 may further have a plurality of positioning holes 3194, the interposing sheet 330 may further have a plurality of positioning portions 336 allowing the light to pass there through, and the supporting sheet 319 may be assembled onto the interposing sheet 330 through the alignment between the positioning holes 3194 and the positioning portions 336. Moreover, the positions of the transparent pattern areas 3126, the through holes 3162, and the positioning portions 336 are corresponding to the positions of the LEDs 328, such that the light provided by the LEDs 328 uniformly irradiates the transparent pattern areas 3126.

In the above descriptions, the input panel 300 is for example applied in the portable electronic device 10, but the input panel 300 may also be used in other electronic devices besides the portable electronic device.

To sum up, the input panel of the present invention has a sensing circuit board and a switch sheet. Therefore, the input panel can not only sense a touch action provided when the user inputs an instruction, but also provide the user with a touch feeling similar to the feeling of pressing the button, so that the user may confirm whether the action of inputting instruction is finished or not. Moreover, the interposing sheet is assembled to the supporting sheet through the alignment between the positioning holes and the positioning portions, and the light provided by the LEDs disposed on the circuit board passes through the supporting sheet and the interposing sheet to uniformly irradiate the transparent pattern area on the touch-sensing sheet. Furthermore, through adopting the input panel, the portable electronic device of the present invention is capable of offering a desirable manipulating feeling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An input panel, applicable for a portable electronic device, the input panel comprising:
 a switch sheet, comprising:
  a circuit board, having at least one contact pad; and
  at least one dome switch, disposed on the contact pad;
 a touch-sensing sheet, disposed on the switch sheet for sensing a touch action, wherein the touch-sensing sheet comprises:
  a keypad lens;
  a sensing circuit board, for sensing the touch action; and a supporting sheet, wherein the sensing circuit board is disposed between the keypad lens and the supporting sheet;

an interposing sheet, disposed between the switch sheet and the touch-sensing sheet, wherein the touch-sensing sheet contacts the dome switch when the touch-sensing sheet is pressed, so that the dome switch is deformed elastically to switch on the contact pad; and an enter key cap having a pressing portion, wherein the keypad lens has a first opening, the pressing portion has a shape substantially consistent with that of the first opening, so as to be disposed into the first opening, the supporting sheet has a second opening corresponding to the first opening, and at least a part of the second opening is covered by the interposing sheet.

2. The input panel as claimed in claim 1, wherein the touch-sensing sheet further comprises:

a first adhesion layer, disposed between the keypad lens and the sensing circuit board; and a second adhesion layer, disposed between the supporting sheet and the sensing circuit board.

3. The input panel as claimed in claim 1, wherein the sensing circuit board is electrically connected to the circuit board.

4. The input panel as claimed in claim 1, wherein the sensing circuit board is a capacitor sensing circuit board or a thermal sensing circuit board.

5. The input panel as claimed in claim 1, wherein the switch sheet further comprises a plastic sheet, and the dome switch and the plastic sheet are formed integrally.

6. The input panel as claimed in claim 1, wherein the switch sheet further comprises at least one light emitting diode (LED) disposed on the circuit board, the touch-sensing sheet further comprises at least one transparent pattern area having a position corresponding to that of the LED, and the portion of the interposing sheet corresponding to the transparent pattern area allows the light to pass there through.

7. The input panel as claimed in claim 1, wherein the interposing sheet has at least one protrusion corresponding to the dome switch, and the touch-sensing sheet contacts the dome switch via the protrusion when the touch-sensing sheet is pressed.

8. A portable electronic device, comprising:

a casing;

a display unit, assembled to the casing, and having a display area, wherein the display area is exposed out of the casing;

an input panel, assembled to the casing, and electrically connected to the display unit, wherein the input panel comprises:

a switch sheet, comprising:

a circuit board, having at least one contact pad;

at least one dome switch, disposed on the contact pad;

a touch-sensing sheet, disposed on the switch sheet for sensing a touch action, wherein the touch-sensing sheet comprises:

a keypad lens;

a sensing circuit board, for sensing the touch action; and a supporting sheet, wherein the sensing circuit board is disposed between the keypad lens and the supporting sheet;

an interposing sheet, disposed between the switch sheet and the touch-sensing sheet, wherein the touch-sensing sheet contacts the dome switch when the touch-sensing sheet is pressed, so that the dome switch is deformed elastically to switch on the contact pad; and an enter key cap having a pressing portion, wherein the keypad lens has a first opening, the pressing portion has a shape substantially consistent with that of the first opening, so as to be disposed into the first opening, the supporting sheet has a second opening corresponding to the first opening, and at least a part of the second opening is covered by the interposing sheet.

9. The portable electronic device as claimed in claim 8, wherein the touch-sensing sheet further comprises:

a first adhesion layer, disposed between the keypad lens and the sensing circuit board; and a second adhesion layer, disposed between the supporting sheet and the sensing circuit board.

10. The portable electronic device as claimed in claim 8, wherein the sensing circuit board is electrically connected to the circuit board.

11. The portable electronic device as claimed in claim 8, wherein the sensing circuit board is a capacitor sensing circuit board or a thermal sensing circuit board.

12. The portable electronic device as claimed in claim 8, wherein the switch sheet further comprises a plastic sheet, and the dome switch and the plastic sheet are formed integrally.

13. The portable electronic device as claimed in claim 8, wherein the switch sheet further comprises at least one light emitting diode (LED) disposed on the circuit board, the touch-sensing sheet further comprises at least one transparent pattern area having a position corresponding to that of the LED, and the portion of the interposing sheet corresponding to the transparent pattern area allows the light to pass there through.

14. The portable electronic device as claimed in claim 8, wherein the interposing sheet has at least one protrusion corresponding to the dome switch, and the touch-sensing sheet contacts the dome switch via the protrusion when the touch-sensing sheet is pressed.

* * * * *